US008161379B2

(12) United States Patent
Waltman et al.

(10) Patent No.: US 8,161,379 B2
(45) Date of Patent: Apr. 17, 2012

(54) FIT AND FILL TECHNIQUES FOR PICTURES

(75) Inventors: David W. Waltman, Lake Stevens, WA (US); Zhao-Hong Mai, Bellevue, WA (US); Auston W. Zahrt, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 12/142,800

(22) Filed: Jun. 20, 2008

(65) Prior Publication Data
US 2009/0319887 A1 Dec. 24, 2009

(51) Int. Cl.
*G06F 17/00* (2006.01)
(52) U.S. Cl. ........................................ 715/247
(58) Field of Classification Search ............. 715/202, 715/247
See application file for complete search history.

(56) References Cited

U.S. PATENT DOCUMENTS

| 6,178,432 | B1 | 1/2001 | Cook et al. | |
|---|---|---|---|---|
| 6,195,101 | B1 | 2/2001 | Ghislain Bossut et al. | |
| 6,912,311 | B2 | 6/2005 | Anderson et al. | |
| 6,964,025 | B2 | 11/2005 | Angiulo et al. | |
| 7,627,174 | B1 * | 12/2009 | Adams et al. ............... | 382/173 |
| 7,689,909 | B1 * | 3/2010 | Szuszczewicz ............ | 715/243 |
| 2002/0040375 | A1 | 4/2002 | Simon et al. | |
| 2003/0152291 | A1 * | 8/2003 | Cheatle ........................ | 382/296 |
| 2004/0239982 | A1 * | 12/2004 | Gignac ........................ | 358/1.15 |
| 2005/0007382 | A1 * | 1/2005 | Schowtka ................... | 345/619 |
| 2005/0025387 | A1 | 2/2005 | Luo | |
| 2005/0094207 | A1 * | 5/2005 | Lo et al. ..................... | 358/1.18 |
| 2005/0104897 | A1 * | 5/2005 | Walker et al. .............. | 345/620 |
| 2006/0026507 | A1 * | 2/2006 | Balinsky et al. ............ | 715/517 |
| 2006/0206807 | A1 * | 9/2006 | Rosner et al. .............. | 715/515 |
| 2007/0024908 | A1 | 2/2007 | Hanechak | |
| 2007/0024909 | A1 | 2/2007 | Hanechak | |
| 2009/0146961 | A1 * | 6/2009 | Cheung et al. .............. | 345/172 |

OTHER PUBLICATIONS

Elferdink, Iwork '05: The Missing Manual, O'Reilly Media, Inc., Sep. 21, 2005, p. 85-136.*
"Basic Pagemaker 7", Retrieved at <<http://ctl.clayton.edu/cid/tutorials/Misc/PageMaker/BasicPageMaker7/default.htm>>, Clayton State University, Retrieved Date: Feb. 18, 2008, pp. 18.
"FotoPros: Editor Guide", Retrieved at <<http://www.myfotopros.co,/EditorGuide.aspx>>, FotoPros LLC, Retrieved Date: Feb. 18, 2008, pp. 6.
Johnson, Dave, "Digital Focus: Scale Pictures for Framing", Retrieved at <<http://pcworld.about.net/news/Sep162003id112300.htm>>, Sep. 16, 2003, pp. 2.

* cited by examiner

*Primary Examiner* — Laurie Ries
*Assistant Examiner* — Frank D Mills
(74) *Attorney, Agent, or Firm* — Turk IP Law, LLC

(57) ABSTRACT

Various technologies and techniques are disclosed for fitting and filling pictures in documents. A selection is received from a user to perform a fill or fit to placeholder operation to insert a picture into a placeholder. A visible image area is calculated which determines what portion of the picture will appear in the placeholder. The user is able to slide the picture back and forth within the placeholder until a desired crop is achieved. The picture is cropped so that the placeholder is kept intact and original aspect ratios of the placeholder and picture are both preserved. When a rotation of the placeholder is different than a rotation of the picture being inserted, then an axis-aligned bounding box is calculated for the picture or the placeholder to complete the fit or fill operation.

18 Claims, 8 Drawing Sheets

FIT AND FILL TECHNIQUES FOR PICTURES

BACKGROUND

Desktop publishing applications such as MICROSOFT® Publisher typically provide libraries of templates that can be used for creating content. These templates often contain pictures in positions and dimensions that are important to the overall design of the template. When users replace these pictures with their own content in a particular desktop publishing application, the placeholders (or frames) that the original pictures were in are changed to fit the aspect ratio of the new picture. Changing the aspect ratio of the original placeholder may cause undesired changes in the overall look of the document, since the design was originally intended for a picture with another aspect ratio. In other words, the user may now need to adjust the layout of the publication to accommodate the size and orientation of the new picture that was inserted.

For example, consider a template designed with a picture that is cropped to a horizontal rectangle and flanked by two text boxes. Suppose that the picture that a user wants to insert is oriented as a vertical rectangle. When the user inserts the new picture, the horizontal rectangle becomes a vertical one, leaving large amounts of unused space on both sides of the picture, and possibly interfering with the position of objects below the picture on the page. Alternatively, the vertical rectangle may be scaled so the long side of the new picture fits within the short side of the original picture. This would leave a very tiny vertical picture inside a wide placeholder with a lot of unused space.

A user could solve this problem by cropping and scaling the new picture to fit the exact dimensions of the original placeholder, but this can be a tedious and time consuming process.

SUMMARY

Various technologies and techniques are disclosed for replacing pictures in documents. Techniques for filling and fitting to a placeholder are described. A selection is received from a user to perform a fill or fit to placeholder operation to insert a picture into a placeholder. In one implementation, this can be performed to insert a new picture into a placeholder. In another implementation, this can be performed on an existing picture within a placeholder to adjust the size of the existing picture. In the case of a fill operation, a visible image area is calculated that controls which region of the picture will be filled to the placeholder. The picture is cropped so that the placeholder is kept intact and the original aspect ratios of the placeholder and the picture are both preserved.

In one implementation, a method is described for providing repositionable crop behavior when performing a fill or fit to placeholder operation. A selection is received from a user to perform a fill or fit to placeholder operation on a picture in a placeholder, the picture having a different aspect ratio than an original aspect ratio of the placeholder. In the case of a fill operation, a visible image area is calculated that controls which region of the picture will be filled into the placeholder. The picture is cropped so that the placeholder is kept intact and the original aspect ratios of the placeholder and the new picture are both preserved. The user is able to slide the picture back and forth within the placeholder to further modify the crop after the fill or fit to placeholder operation is complete.

In one implementation, techniques for dealing with rotation when fitting or filling pictures to placeholders using an axis-aligned bounding box are described. The term "axis-aligned bounding box" as used herein is meant to include a box or hyper rectangle of minimal dimensions with its edges parallel to the coordinate axes that contains set S, where set S is in an N-dimensional space endowed with a coordinate system. When a fit to placeholder operation is being performed and when a rotation of a placeholder is different than a rotation of a picture being inserted into the placeholder, then an axis-aligned bounding box of the picture is projected to coordinates of the placeholder. When a fill to placeholder operation is being performed, and when a rotation of the placeholder is different than a rotation of a picture being inserted into the placeholder, then an axis-aligned bounding box of the placeholder is projected to coordinates of the picture. In both cases, the axis-aligned bounding box is used to determine how much to scale the picture while preserving the rotation of the picture.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as techniques for replacing pictures while preserving aspect ratios, but the technologies and techniques also serve other purposes in addition to these. In one implementation, one or more of the techniques described herein can be implemented as features within a desktop publishing program such as MICROSOFT® Publisher, or from any other type of program or service that allows users to layout documents that contain pictures.

In one implementation, picture replacement techniques are described herein that help a user insert a picture which may have a different aspect ratio than a placeholder without changing the dimensions, aspect ratio or position of the placeholder. In other words, a picture having an aspect ratio of 4:8 can be inserted into a placeholder having an aspect ratio of 4:4, and after inserted, the picture will have still have an aspect ratio of 4:8 and the placeholder will still have an aspect ratio of 4:4. In other words, the original aspect ratio of the placeholder is preserved, and so is the original aspect ratio of the picture. The term "aspect ratio" as used herein means the height of an image divided by its width. The placeholder can be an empty frame, or it can contain another picture.

A "fill to placeholder operation" is performed such that the picture is inserted in the placeholder and scaled such that the picture fills the entire area of the placeholder while also preserving the original aspect ratios of the placeholder and the picture. In one implementation, the user may slide the picture back and forth within the placeholder in what is called "pan and crop mode" until the desired crop is achieved. If the user does not wish to crop the picture in this way, she can choose a "fit to placeholder operation", which will scale the picture to completely fit within the placeholder, which can result in space appearing on one or more sides of the placeholder, but that still preserves the aspect ratios of both the placeholder and the picture. In one implementation, the user again has the option to slide the picture back and forth within the placeholder in pan and crop mode after the fit operation is completed.

Turning now to FIGS. 1-7, the stages for implementing one or more implementations of the picture fill and fit techniques are described in further detail. In some implementations, the processes of FIG. 1-7 are at least partially implemented in the operating logic of computing device 500 (of FIG. 8).

Figure 1:
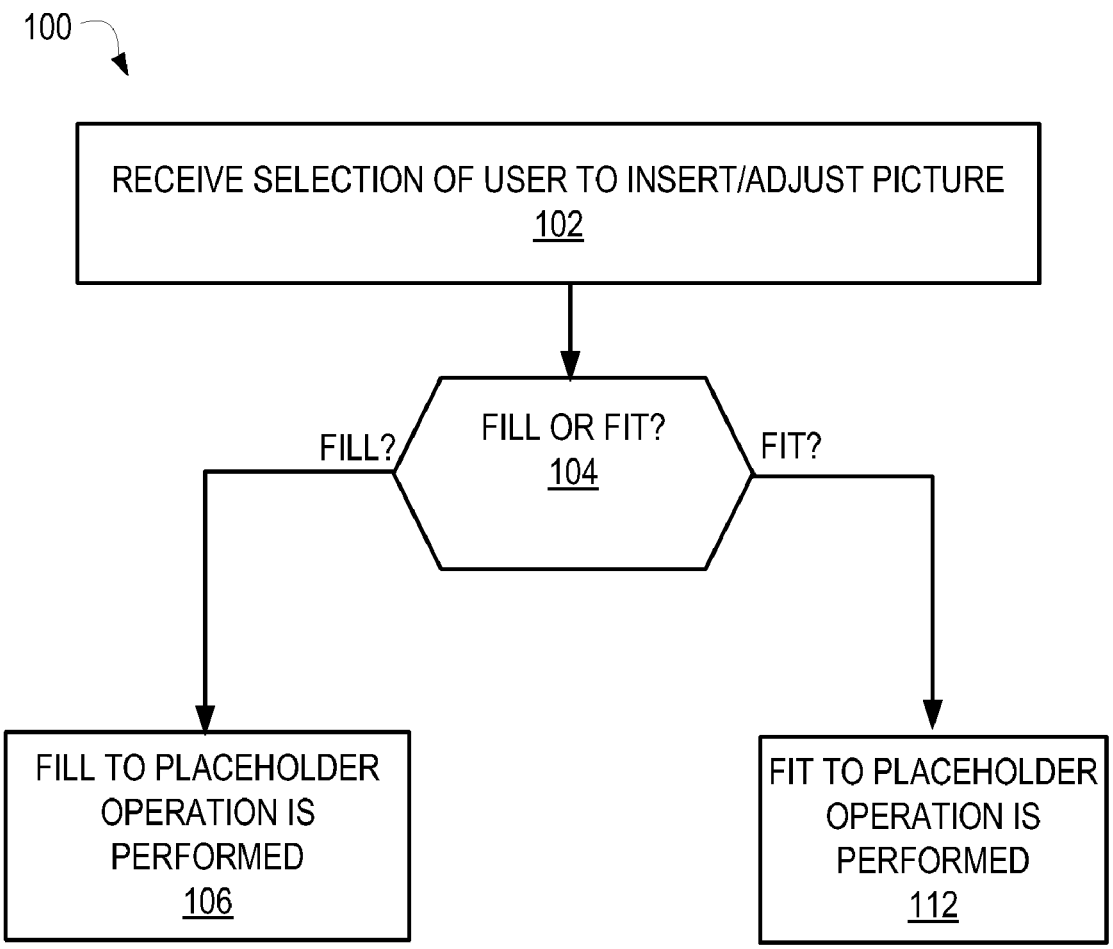
FIG. 1 is a process flow diagram for one implementation illustrating the high level stages involved in inserting or adjusting a picture in a placeholder.

FIG. 1 is a process flow diagram 100 for one implementation illustrating the high level stages involved in inserting a picture into a placeholder. The term "inserting a picture into a placeholder" as used herein is meant to include inserting a new picture into a placeholder, adjusting an existing picture to a different size within the placeholder, or replacing an existing picture in a placeholder with a new picture. A selection is received from a user to insert a picture into a placeholder (stage 102). One example of a selection that the user can make to initiate the picture insertion is to select an icon on a toolbar that is assigned to an insert picture operation. Another example of a selection that the user can make to initiate the picture insertion is by dragging and replacing another picture already contained in the placeholder. The placeholder can be an empty frame, or the placeholder can contain another picture. Alternatively or additionally, the picture may already be located inside the placeholder, and the user has initiated the process to adjust the crop and scaling of the picture.

A determination is made that a fill to placeholder operation is to be performed (decision point 104). The user could select an option from within a user interface (such as an icon on a toolbar) to perform a fill to placeholder operation. This can either be part of the same step described in stage 102 when the user initiated the insert picture operation, or in a separate step to specify the type of insertion. Alternatively or additionally, a fill to placeholder operation can be initiated automatically, such as when the user is trying to insert a picture into a placeholder that has a different aspect ratio than the placeholder.

Once a fill to placeholder operation has been initiated, then the fill to placeholder operation is performed (stage 106). During this operation, a visible image area is calculated that controls which portion of the picture will appear within the placeholder. The term "visible image area" as used herein refers to that region within the picture which will appear inside the placeholder. In the case of the fill to placeholder operation, the visible image area is equal to the size of the placeholder. The visible image area is calculated as part of the fill to placeholder operation described in detail in FIG. 2.

The user is able to slide the picture back and forth within the placeholder until the desired crop is achieved. The sliding back and forth to achieve a desired crop is referred to as "pan and crop mode", and is illustrated further in FIG. 3. Once the user has found the desired crop, an option can be selected to finalize the cropping, such as by clicking away from the picture, or by clicking a commit crop option. During the fill to placeholder operation, the picture is cropped such that the placeholder is kept intact, while preserving the original aspect ratios of the placeholder and the picture. In other words, the picture is cropped to fit the existing size of the placeholder so the placeholder size and original aspect ratios for both the placeholder and the picture are preserved even after the picture has been inserted.

If a fit to placeholder operation is selected or is otherwise determined to be appropriate (decision point 104), then a fit to placeholder operation is performed to scale the picture into the placeholder (stage 112). Note that a fit to placeholder operation as described herein can result in space appearing on one or more sides of the picture within the placeholder, but the aspect ratios of both the placeholder and the picture are still preserved. The fit to placeholder operation is described in further detail in FIG. 6.

The fit to placeholder operation could be selected by a user, such as upon selecting an icon on a toolbar. Alternatively or additionally, the fit to placeholder operation could be determined programmatically, such as when the size and aspect ratio of a picture being inserted is identical to the size and aspect ratio of the placeholder.

Figure 2:
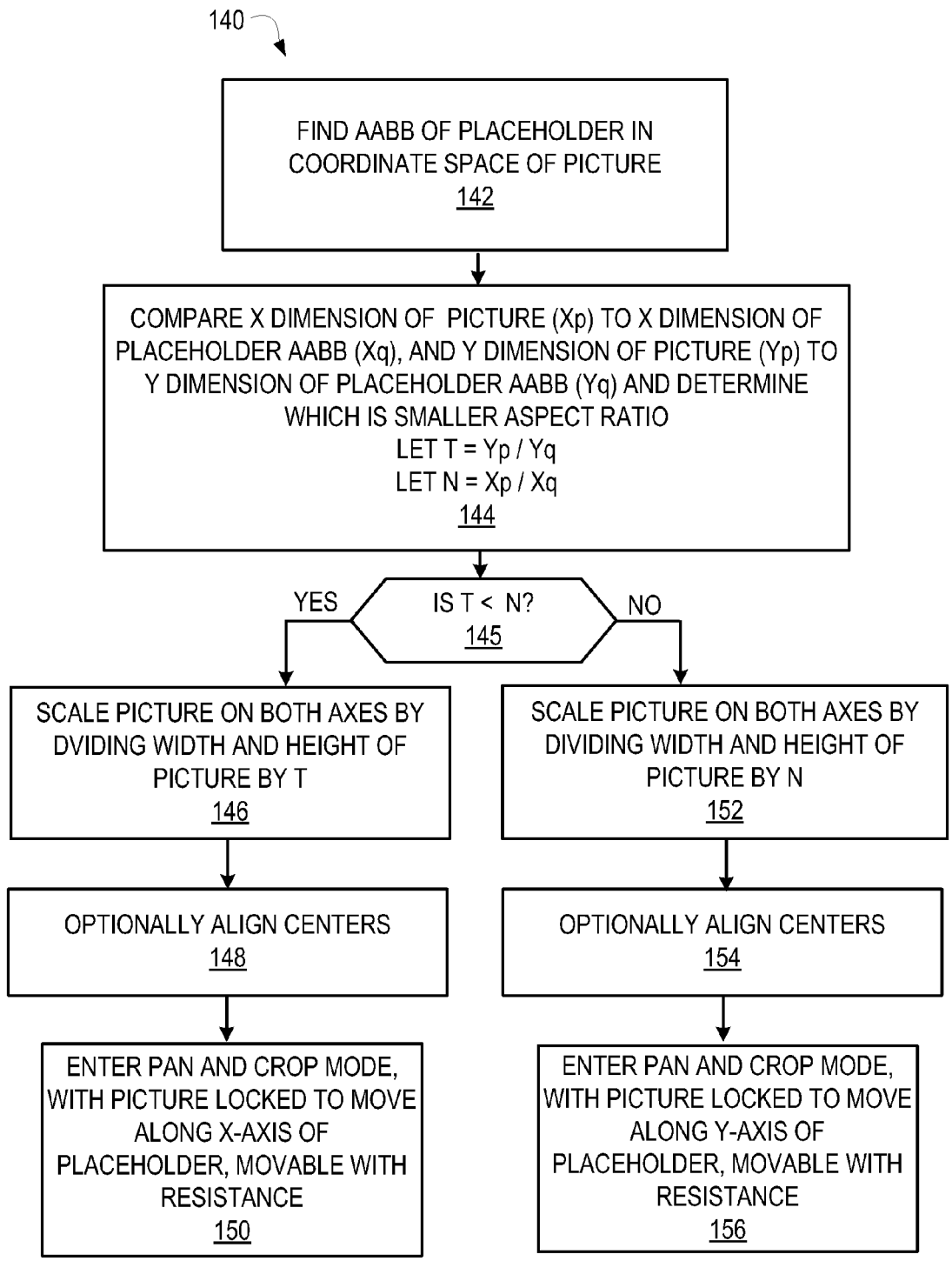
FIG. 2 is a process flow diagram for one implementation illustrating the stages involved in performing a fill to placeholder operation.

FIG. 2 is a process flow diagram 140 for one implementation illustrating the stages involved in performing a fill to placeholder operation. The axis-aligned bounding box (AABB) of the placeholder is calculated in the coordinate space of the picture (stage 142). The terms "axis-aligned bounding box" and "AABB" as used herein are meant to include a box or hyper rectangle of minimal dimensions with its edges parallel to the coordinate axes that contains set S, where set S is in an N-dimensional space endowed with a coordinate system. For the techniques described herein, set S is either the picture or the placeholder, depending on which one is being calculated for the coordinate space of the other. The usage of an axis-aligned bounding box to handle rotated pictures is explained more fully in FIG. 5. The X dimension of the picture being inserted (Xp) is compared to the X dimension of the placeholder (Xq), and the Y dimension of the picture being inserted (Yp) is compared to the Y dimension of the placeholder (Yq) to determine which aspect ratio is smaller (stage 144). The variables T and N are used in the comparison to determine which aspect ratio is smaller, and can be defined as follows:

Let $T = Yp/Yq$

Let $N = Xp/Xq$

If value T is less than value N (decision point 145), then the picture is scaled on both axes by dividing the width and height of the picture by T (stage 146). The centers of the picture being inserted and the placeholder are optionally aligned (stage 148). Pan and crop mode is entered, with the picture to be inserted being locked to move along the x-axis of the placeholder, movable with resistance (stage 150). An example of a fill operation where the picture is locked to move along the x-axis of the placeholder is illustrated in FIG. 3B.

If value T is greater than value N (decision point 145), then the picture is scaled on both axes by dividing the width and height of the picture by N (stage 152). The centers of the picture being inserted and the placeholder are optionally aligned (stage 154). Pan and crop mode is entered, with the picture to be inserted being locked to move along the y-axis of the placeholder, movable with resistance (stage 156). An example of a fill operation where the picture is locked to move along the y-axis of the placeholder is illustrated in FIG. 4.

Figure 3A:
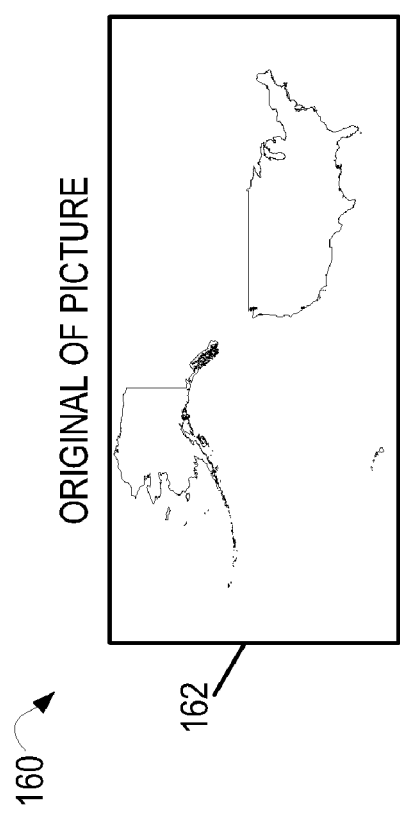
FIGS. 3A-3B are diagrammatic views for one implementation illustrating filling a picture into a placeholder while entering pan and crop mode and preserving the aspect ratio of the picture and the placeholder.
Figure 3B:
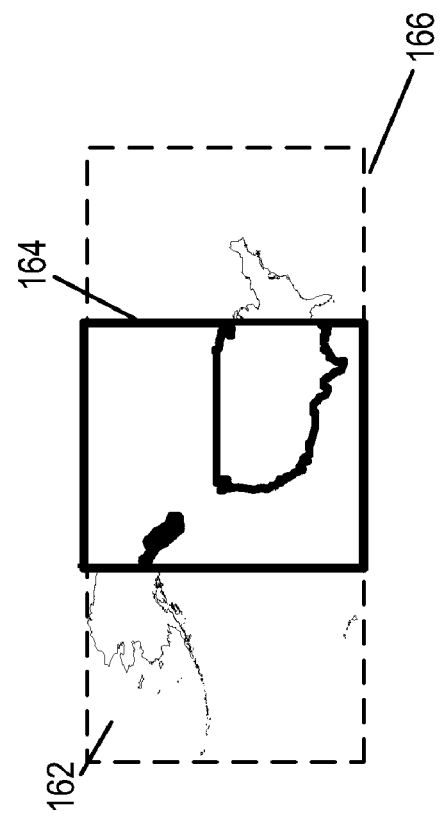

FIGS. 3A-3B are diagrammatic views 160 for one implementation that illustrates the filling of a picture into a placeholder while entering pan and crop mode and preserving the aspect ratio of the picture. In the example shown, the original version of the picture 162 is too big to fit into the placeholder 164. Thus, in order to preserve the aspect ratio of the placeholder 164 and the original aspect ratio of the picture 162, the fill to placeholder operation is performed. A visible image area is calculated as described in FIG. 2 to identify the region of the picture which will be filled within the placeholder. Pan and crop mode is activated such that the portion of the picture 162 that fits into the placeholder 164 can be selected by moving the picture 162 back and forth along the x-axis 166 of the visible image area for the placeholder 164 until a desired crop is achieved. The end result is that the picture is inserted into the placeholder and cropped so that the original aspect ratios of both the placeholder and the picture are preserved.

Figure 4A:
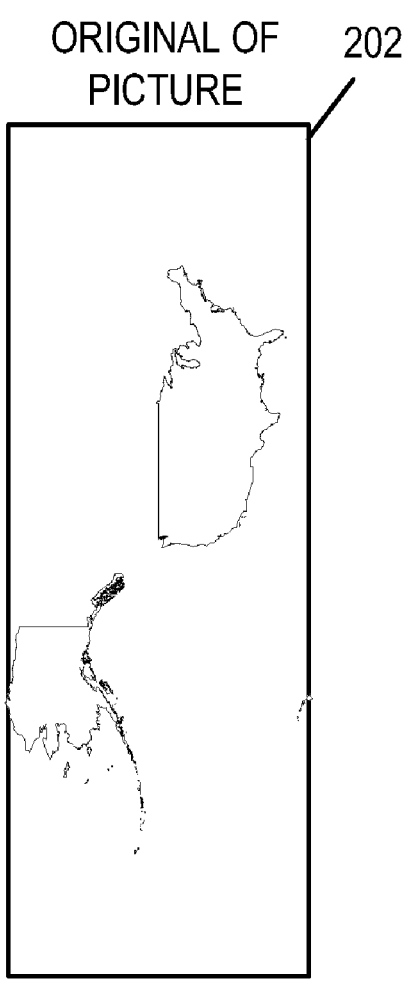
FIGS. 4A-4B are diagrammatic views for one implementation illustrating a picture that is vertical in nature that is being filled into a smaller vertical placeholder.
Figure 4B:
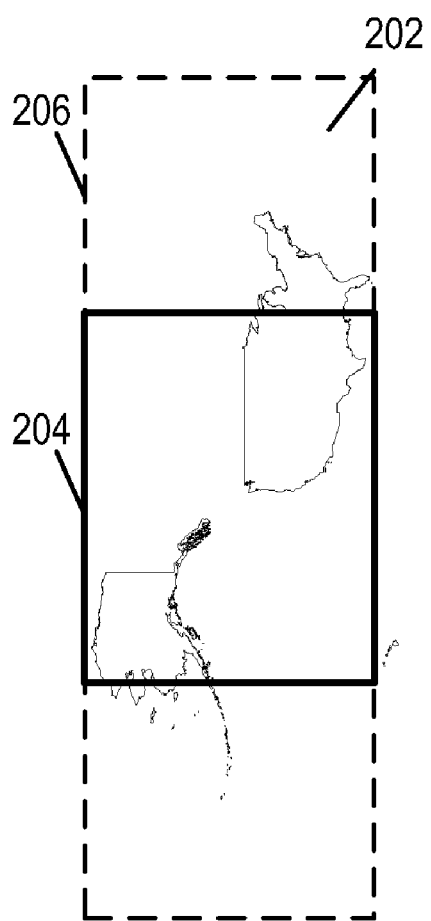

FIGS. 4A-4B are diagrammatic views 200 for one implementation that illustrates a picture 202 that is vertical in nature being filled into a smaller vertical placeholder 204. The fill to placeholder works in the same fashion as described in FIG. 3 in this scenario too, except that the portion of the picture 202 that fits into the placeholder 204 can be selected by moving the picture back and forth along the y-axis 206 of the placeholder 204 until a desired crop is achieved.

Figure 5B:
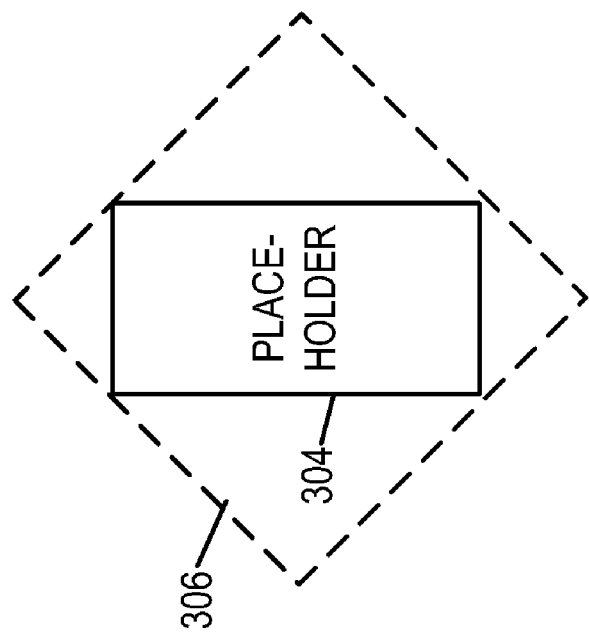
FIGS. 5A-5B are diagrammatic views for one implementation illustrating dealing with rotation when filling a picture into a placeholder.
Figure 5A:
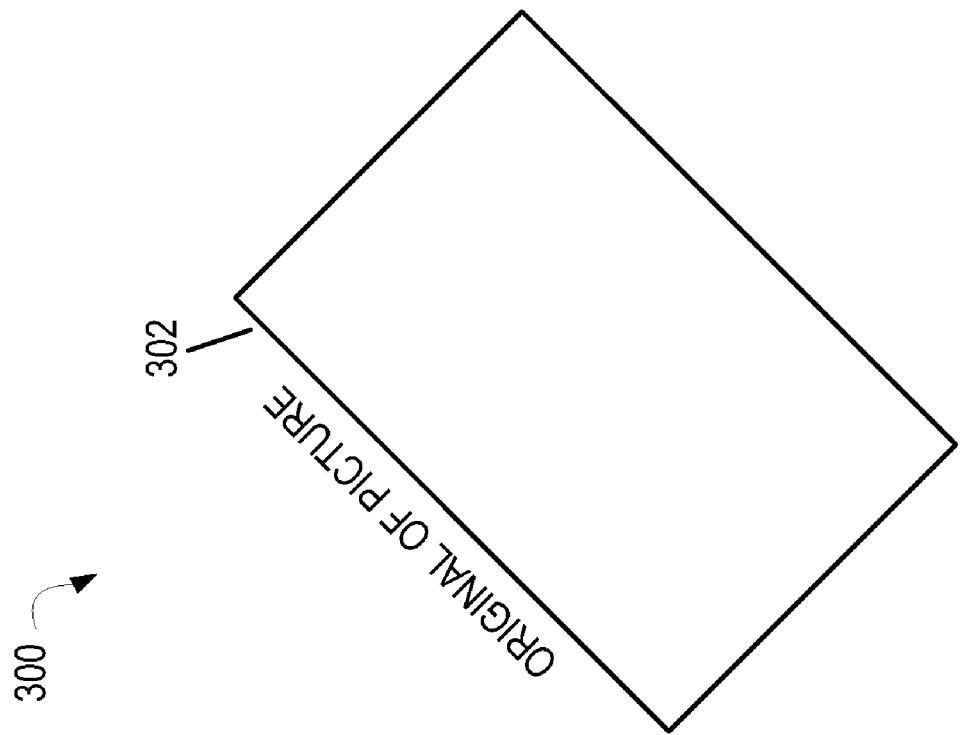

FIG. 5A-5B are diagrammatic views 300 for one implementation dealing with rotation when filling a picture into a placeholder by finding the axis-aligned bounding box of the placeholder. As described in FIG. 2, when the user is filling a picture into a placeholder, if the rotation of the placeholder is not the same as the rotation of the picture being inserted, then the axis-aligned bounding box of the placeholder is projected into the coordinate space of the picture. In the example shown in FIG. 5, the picture 302 is rotated to the left approximately forty-five degrees, and the placeholder 304 is in a normal upright position. An axis-aligned bounding box 306 is projected around the placeholder such that when pan and crop mode is entered, the picture 302 can be inserted in its rotated fashion. In this fashion, the axis-aligned bounding box is used to assist with cropping the picture to the placeholder. When a fill to placeholder operation is being performed, the aspect ratio of the placeholder is also preserved as described previously. The axis-aligned bounding box projection technique also works with a fit to placeholder operation as described in FIG. 6.

Figure 6:
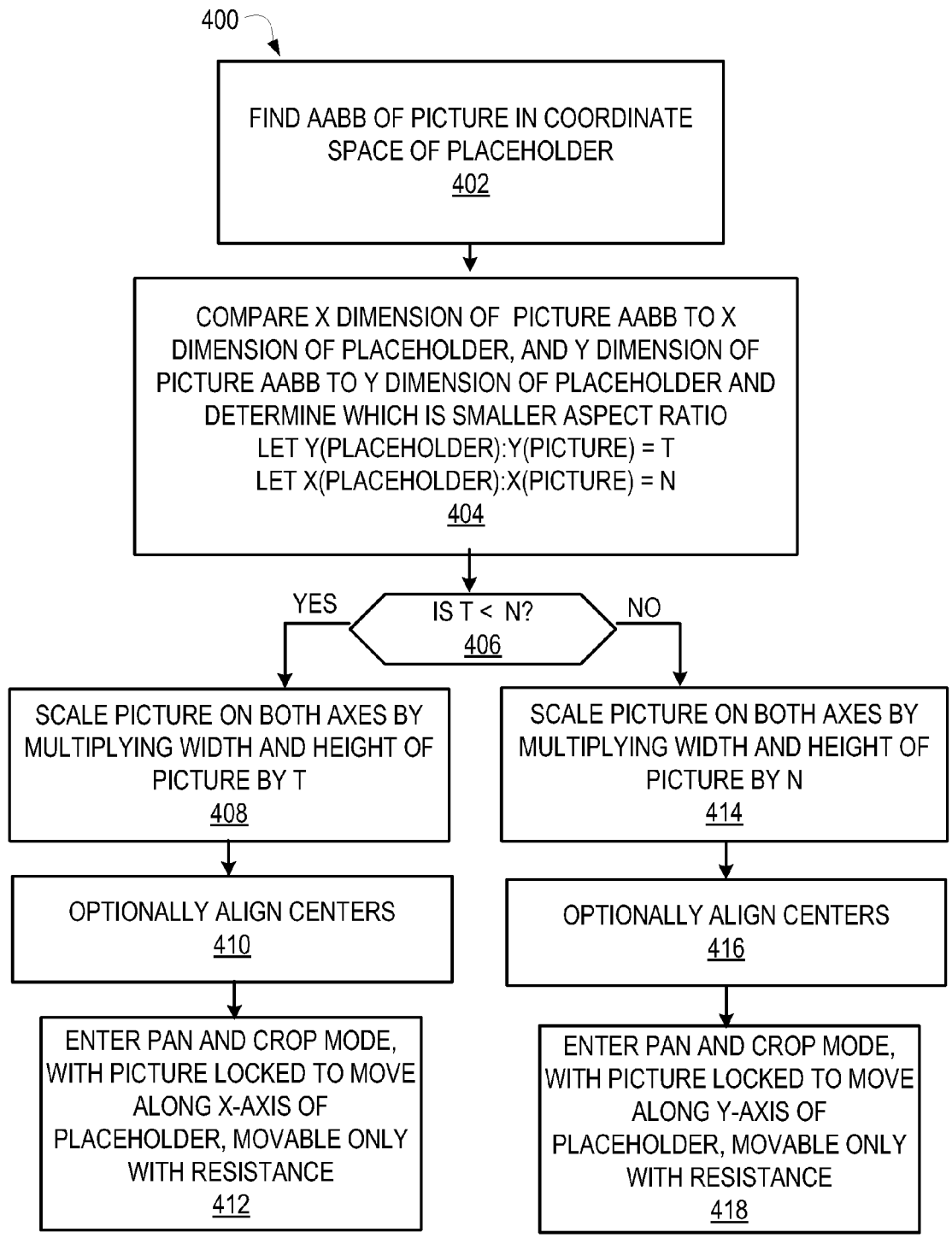
FIG. 6 is a process flow diagram for one implementation illustrating the stages involved in performing a fit to placeholder operation.

FIG. 6 is a process flow diagram 400 for one implementation illustrating the stages involved in performing a "fit to placeholder operation". With a "fit to placeholder operation", the picture is scaled so that it fits inside of the placeholder along one axis, while preserving the original aspect ratios of both the placeholder and the picture. Except when the placeholder and the picture are identical in size, the fit to placeholder operation will leave space (such as whitespace) around the picture on one or more sides of the placeholder. If a rotation of the placeholder is not the same as the rotation of the picture being inserted, then the axis-aligned bounding box of the picture is calculated in the coordinate space of the placeholder (stage 402). The X dimension of the picture being inserted (Xp) is compared to the X dimension of the placeholder (Xq), and the Y dimension of the picture being inserted (Yp) is compared to the Y dimension of the placeholder (Yq) to determine which aspect ratio is smaller (stage 404). The variables T and N are used in the comparison to determine which aspect ratio is smaller, and can be defined as follows:

Let $T = Yq/Yp$

Let $N = Xq/Xp$

If value T is less than value N (decision point 406), then the picture is scaled on both axes by multiplying the width and height of the picture by T (stage 408). The centers of the picture being inserted and the placeholder are optionally aligned (stage 410). Pan and crop mode is entered, with the picture to be inserted being locked to move along the x-axis of the placeholder, movable with resistance (stage 412).

If value T is greater than value N (decision point 406), then the picture is scaled on both axes by multiplying the width and height of the picture by N (stage 414). The centers of the picture being inserted and the placeholder are optionally aligned (stage 416). Pan and crop mode is entered, with the picture to be inserted being locked to move along the y-axis of the placeholder, movable with resistance (stage 418). An example of a fit operation where the picture is locked to move along the y-axis of the placeholder is illustrated in FIG. 7B.

Figure 7A:
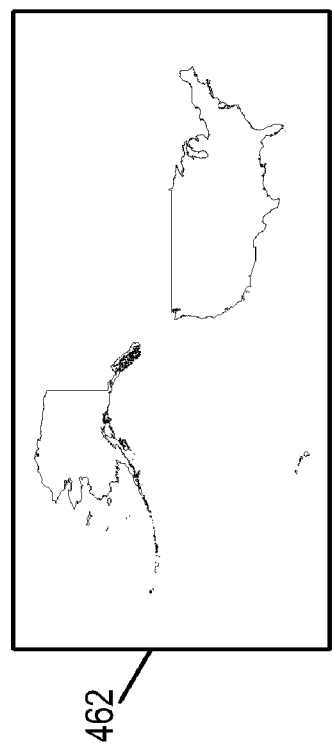
FIGS. 7A-7B are diagrammatic views for one implementation illustrating fitting a picture into a placeholder while preserving the aspect ratio of the picture and the placeholder.
Figure 7B:
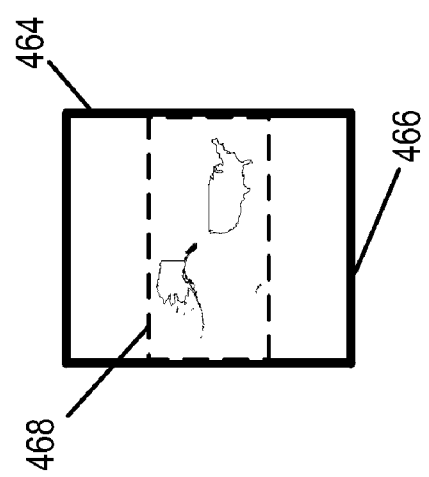

FIGS. 7A-7B are diagrammatic views 460 for one implementation illustrating fitting a picture into a placeholder while preserving the aspect ratio of the picture and the placeholder. Since picture 462 has a different aspect ratio than the placeholder 464, picture 462 is scaled to fit the placeholder along the x-axis 466, while preserving the aspect ratio of both the picture and the placeholder. The result is scaled picture 468. In the example shown in FIG. 7B, this results in whitespace appearing above and below scaled picture 468.

Figure 8:
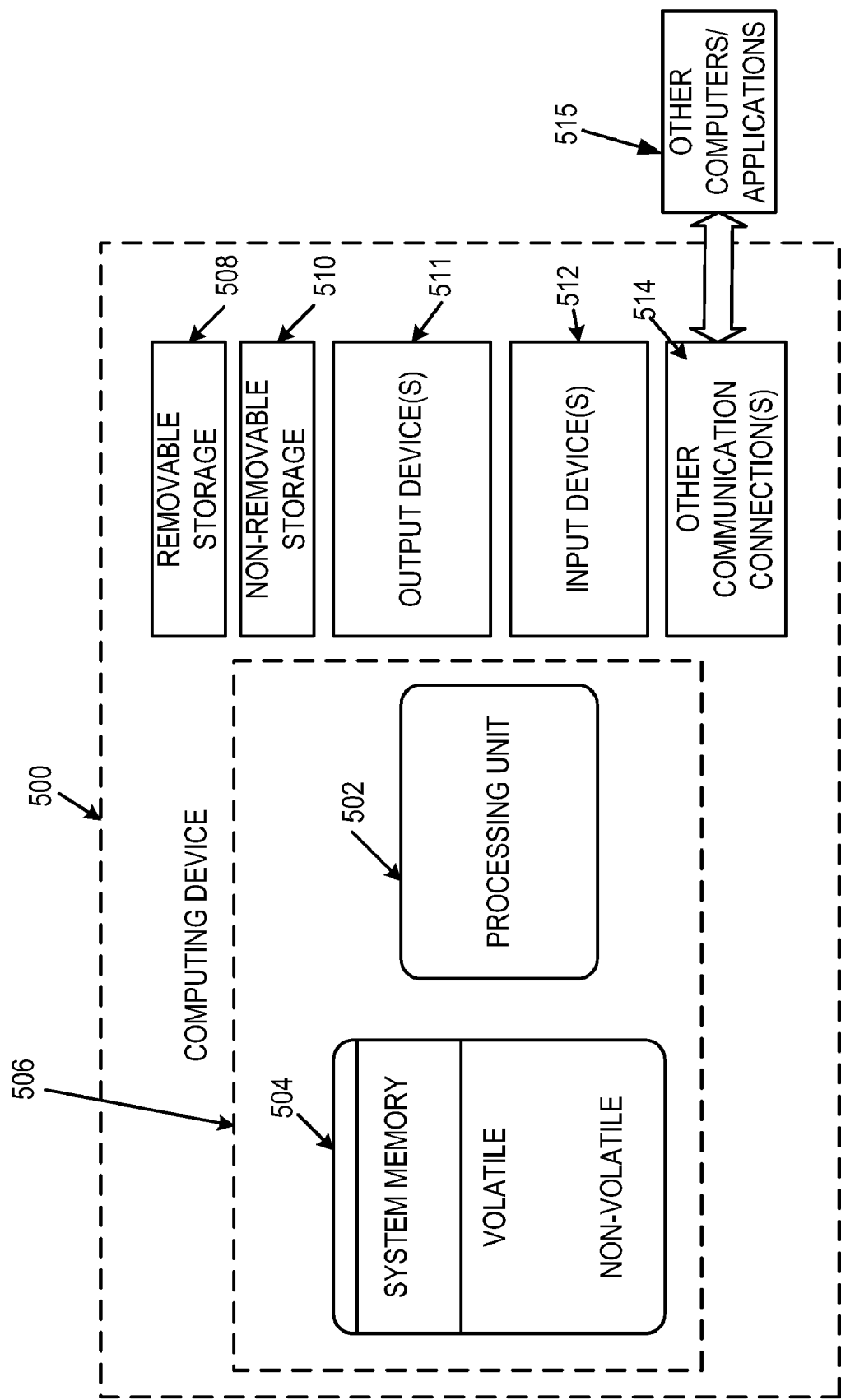
FIG. 8 is a diagrammatic view of a computer system of one implementation.

As shown in FIG. 8, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 8 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 8 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for preserving a size and aspect ratio of a placeholder when inserting or adjusting a picture inside the placeholder comprising the steps of:
   receiving a selection from a user to insert a picture into a placeholder by one of: dragging and dropping a new picture into the placeholder, selecting an icon on a toolbar for inserting the new picture into the placeholder, adjusting an existing picture to a different size within the placeholder, and replacing the existing picture in the placeholder with the new picture;
   receiving a user selection of one of: a fit to placeholder operation and a fill to placeholder operation;
   calculating a visible image area of the picture which will appear in the placeholder based on the user selection, wherein if the fit to placeholder operation is selected, a visible image area of the picture is equal to a size of the picture, and if the fill to placeholder operation is selected, the visible image area of the picture is equal to a size of the placeholder;
   if the fit to placeholder operation is selected, scaling the picture to a calculated visible image area such that the picture completely fits within the placeholder resulting in empty space appearing on one or more sides of the picture;
   if the fill to placeholder operation is selected, scaling the picture to the calculated visible image area such that the picture fills an entire area of the placeholder;
   enabling the user to slide the picture back and forth within the placeholder to further modify the visible image area after the insert is complete;
   enabling the user to select an option to finalize cropping when a desired crop is achieved;
   cropping the picture so that the placeholder is kept intact, the aspect ratio of the placeholder is preserved, and the aspect ratio of the scaled picture is preserved;
   when a rotation of the placeholder is different than a rotation of the picture being inserted into the placeholder, then calculating an axis-aligned bounding box, wherein the axis-aligned bounding box includes one of a box and a hyper rectangle of minimal dimensions with edges parallel to coordinate axes of the placeholder; and
   using the axis-aligned bounding box to control which region of the picture appears in the placeholder so that the rotation of the picture is preserved.

2. The method of claim 1, wherein the placeholder is an empty frame.

3. The method of claim 1, wherein another picture occupies the placeholder.

4. The method of claim 1, wherein the picture already occupies the placeholder and the insert is being performed to resize the picture within the placeholder.

5. The method of claim 1, wherein the picture has a different aspect ratio than the placeholder.

6. The method of claim 1, wherein when a fit operation is performed, and when a rotation of the placeholder is different than a rotation of the picture, then calculating a bounding box of the picture in a coordinate space of the placeholder.

7. The method of claim 1, wherein when a fill operation is performed, and when a rotation of the placeholder is different than a rotation of the picture, then calculating an axis-aligned bounding box of the placeholder in a coordinate space of the picture.

8. The method of claim 1, wherein an axis-aligned bounding box is used in cropping the picture to the placeholder.

9. A method for providing repositionable crop behavior when performing a fill or fit to placeholder operation comprising the steps of:
   receiving a selection from a user to insert a picture in a placeholder, by one of: dragging and dropping a new picture into the placeholder, selecting an icon on a toolbar for inserting a new picture into the placeholder, adjusting an existing picture to a different size within the placeholder, and replacing the existing picture in the placeholder with a new picture; the picture having an aspect ratio that is different from an aspect ratio of the placeholder;
   calculating a visible image area of the picture which will appear in the placeholder based on the user selection of one of: a fill to placeholder operation and a fit to placeholder operation, wherein if the fit to placeholder operation is selected, the visible image area of the picture is equal to a size of the picture, and if the fill to placeholder operation is selected, the visible image area of the picture is equal to a size of the placeholder;
   if the fit to placeholder operation is selected, scaling the picture to a calculated visible image area such that the picture completely fits within the placeholder resulting in empty space appearing on one or more sides of the picture;
   if the fill to placeholder operation is selected, scaling the picture to the calculated visible image area such that the picture fills an entire area of the placeholder;
   enabling the user to slide the picture back and forth within the placeholder to further modify the visible image area after the insert is complete;
   enabling the user to select an option to finalize the cropping when the desired crop is achieved;
   cropping the picture so that the placeholder is kept intact, the aspect ratio of the placeholder is preserved, and the aspect ratio of the scaled picture is preserved;
   when a rotation of the placeholder is different than a rotation of the picture being inserted into the placeholder, then calculating an axis-aligned bounding box, wherein the axis-aligned bounding box includes one of a box and a hyper rectangle of minimal dimensions with edges parallel to coordinate axes of the placeholder; and
   using the axis-aligned bounding box to control which region of the picture appears in the placeholder so that the rotation of the picture is preserved.

10. The method of claim 9, wherein an empty frame occupies the placeholder.

11. The method of claim 9, wherein another picture occupies the placeholder.

12. The method of claim 9, wherein when a fit operation is performed, and when a rotation of the placeholder is different than a rotation of the picture, then calculating an axis-aligned bounding box of the picture in a coordinate space of the placeholder.

13. The method of claim 9, wherein when a fill operation is performed, and when a rotation of the placeholder is different than a rotation of the picture, then calculating an axis-aligned bounding box of the placeholder in a coordinate space of the picture.

14. The method of claim 9, wherein the selection is received from the user to insert the picture by dragging and replacing another picture already occupying the placeholder.

15. The method of claim 9, wherein the selection is received from the user to insert the picture by selecting an icon on a toolbar.

16. A computer-readable memory device having computer-executable instructions for causing a computer to perform steps for preserving a size and aspect ratio of a placeholder when inserting or adjusting a picture inside the placeholder comprising:

receiving a selection from a user to insert a picture in a placeholder, by one of: dragging and dropping a new picture into the placeholder, selecting an icon on a toolbar for inserting the new picture into the placeholder, adjusting an existing picture to a different size within the placeholder, and replacing the existing picture in the placeholder with the new picture, the picture having an aspect ratio that is different from an aspect ratio of the placeholder;

calculating a visible image area of the picture which will appear in the placeholder based on the user selection of one of: a fill to placeholder operation and a fit to placeholder operation, wherein if the fit to placeholder operation is selected, a visible image area of the picture is equal to a size of the picture, and if the fill to placeholder operation is selected, the visible image area of the picture is equal to a size of the placeholder;

if the fit to placeholder operation is selected, scaling the picture to a calculated visible image area such that the picture completely fits within the placeholder resulting in empty space appearing on one or more sides of the picture;

if the fill to placeholder operation is selected, scaling the picture to the calculated visible image area such that the picture fills an entire area of the placeholder;

enabling the user to slide the picture back and forth within the placeholder to further modify the visible image area after the insert is complete;

enabling the user to select an option to finalize cropping when a desired crop is achieved;

cropping the picture so that the placeholder is kept intact, the aspect ratio of the placeholder is preserved, and the aspect ratio of the scaled picture is preserved;

when a rotation of the placeholder is different than a rotation of the picture being inserted into the placeholder, then calculating an axis-aligned bounding box, wherein the axis-aligned bounding box includes one of a box and a hyper rectangle of minimal dimensions with edges parallel to coordinate axes of the placeholder; and using the axis-aligned bounding box to control which region of the picture appears in the placeholder so that the rotation of the picture is preserved.

17. The computer-readable memory device of claim 16, wherein the axis-aligned bounding box is used with the fit to placeholder operation.

18. The computer-readable memory device of claim 16, wherein the axis-aligned bounding box is used with the fill to placeholder operation.

* * * * *